(12) United States Patent
Rance et al.

(10) Patent No.: US 10,140,622 B2
(45) Date of Patent: *Nov. 27, 2018

(54) LEAD GENERATION FOR CONTENT DISTRIBUTION SERVICE

(71) Applicant: BrightTALK Limited, London (GB)

(72) Inventors: Peter Rance, London (GB); Kenneth Winter, London (GB); Dorian Logan, London (GB)

(73) Assignee: BrightTALK Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/480,247

(22) Filed: Apr. 5, 2017

(65) Prior Publication Data

US 2017/0206537 A1 Jul. 20, 2017

Related U.S. Application Data

(63) Continuation of application No. 13/011,652, filed on Jan. 21, 2011, now Pat. No. 9,619,809.

(51) Int. Cl.
| | |
|---|---|
| G06Q 30/02 | (2012.01) |
| G06F 17/30 | (2006.01) |
| H04L 12/24 | (2006.01) |
| H04L 29/08 | (2006.01) |
| H04L 29/06 | (2006.01) |

(52) U.S. Cl.
CPC ..... *G06Q 30/0201* (2013.01); *G06F 17/3089* (2013.01); *G06Q 30/02* (2013.01); *H04L 41/0896* (2013.01); *H04L 67/02* (2013.01); *H04L 67/025* (2013.01); *H04L 67/06* (2013.01); *H04L 67/146* (2013.01); *H04L 67/26* (2013.01); *H04L 67/42* (2013.01)

(58) Field of Classification Search
CPC .................................................. G06Q 30/0201
See application file for complete search history.

(56) References Cited

U.S. PATENT DOCUMENTS

| | | |
|---|---|---|
| 5,565,923 A | 10/1996 | Zdepski |
| 6,442,598 B1 | 8/2002 | Wright et al. |
| 6,728,753 B1 | 4/2004 | Parasnis et al. |
| (Continued) | | |

OTHER PUBLICATIONS

Non-Final Office Action, dated Jan. 21, 2011, U.S. Appl. No. 12/004,532, filed Dec. 21, 2007.

(Continued)

*Primary Examiner* — Fateh M Obaid
(74) *Attorney, Agent, or Firm* — Carr & Ferrell LLP

(57) ABSTRACT

A content distribution service may provide lead information to content providers or other entities associated with a broadcast. The service may include both registered and unregistered (e.g., anonymous) users or subscribers that may each provide data associated with one or more subscriber attributes. Subscriber attribute information may be collected from a subscriber in a progressive manner such that sequentially small portions of data are collected over a period of time. The content distribution service may generate leads by collecting and determining subscriber attributes for each subscriber or anonymous user associated with the service. The leads may be generated in response to a request by a content provider or other requestor, or in response to an event such as the creation of a new broadcast.

17 Claims, 6 Drawing Sheets

(56) References Cited

U.S. PATENT DOCUMENTS

| | | | |
|---|---|---|---|
| 6,760,749 | B1 | 7/2004 | Dunlap et al. |
| 6,774,926 | B1 | 8/2004 | Ellis et al. |
| 7,050,603 | B2 | 5/2006 | Rhoads et al. |
| 7,142,250 | B1 | 11/2006 | Black |
| 7,328,239 | B1 | 2/2008 | Berberian et al. |
| 7,369,515 | B2 | 5/2008 | Salesky et al. |
| 7,412,533 | B1 | 8/2008 | Johnson et al. |
| 7,751,347 | B2 | 7/2010 | Giroti |
| 7,865,567 | B1 | 1/2011 | Hendricks et al. |
| 8,446,846 | B1 | 5/2013 | Saleem et al. |
| 8,514,762 | B2 | 8/2013 | Du Hart, IV et al. |
| 9,015,570 | B2 | 4/2015 | Rance et al. |
| 9,032,441 | B2 | 5/2015 | Rance et al. |
| 9,313,108 | B2 * | 4/2016 | Krupkin .............. G06F 15/177 |
| 9,420,030 | B2 | 8/2016 | Rance et al. |
| 9,584,564 | B2 | 2/2017 | Logan et al. |
| 9,619,809 | B2 | 4/2017 | Rance et al. |
| 2001/0047516 | A1 | 11/2001 | Swain et al. |
| 2002/0016858 | A1 | 2/2002 | Sawada et al. |
| 2002/0036694 | A1 | 3/2002 | Merril |
| 2002/0100061 | A1 | 7/2002 | Tsusaka et al. |
| 2002/0103696 | A1 | 8/2002 | Huang et al. |
| 2002/0104096 | A1 | 8/2002 | Cramer et al. |
| 2002/0116297 | A1 | 8/2002 | Olefson |
| 2002/0120939 | A1 | 8/2002 | Wall et al. |
| 2002/0132611 | A1 | 9/2002 | Immonen et al. |
| 2002/0198943 | A1 | 12/2002 | Zhuang et al. |
| 2003/0034999 | A1 | 2/2003 | Coughlin et al. |
| 2003/0124502 | A1 | 7/2003 | Chou |
| 2003/0158816 | A1 | 8/2003 | Rouse |
| 2003/0200001 | A1 | 10/2003 | Goddard |
| 2004/0032424 | A1 | 2/2004 | Florschuetz |
| 2004/0153504 | A1 | 8/2004 | Hutchinson et al. |
| 2004/0193683 | A1 | 9/2004 | Blumofe |
| 2004/0225728 | A1 | 11/2004 | Huggins et al. |
| 2004/0243922 | A1 | 12/2004 | Sirota et al. |
| 2005/0076387 | A1 | 4/2005 | Feldmeier |
| 2005/0125453 | A1 | 6/2005 | Rozack |
| 2005/0160367 | A1 | 7/2005 | Sirota et al. |
| 2006/0104347 | A1 | 5/2006 | Callan et al. |
| 2006/0111903 | A1 | 5/2006 | Kemmochi et al. |
| 2006/0179454 | A1 | 8/2006 | Shusman |
| 2006/0195353 | A1 | 8/2006 | Goldberg et al. |
| 2007/0044133 | A1 | 2/2007 | Hodecker |
| 2007/0078768 | A1 | 4/2007 | Dawson |
| 2007/0118396 | A1 | 5/2007 | Matz et al. |
| 2008/0195743 | A1 | 8/2008 | Brueck et al. |
| 2008/0196079 | A1 | 8/2008 | Lee et al. |
| 2008/0282293 | A1 | 11/2008 | Frechter et al. |
| 2009/0019374 | A1 | 1/2009 | Logan et al. |
| 2009/0024923 | A1 | 1/2009 | Hartwig et al. |
| 2009/0037520 | A1 | 2/2009 | Loffredo |
| 2009/0055385 | A1 | 2/2009 | Jeon et al. |
| 2009/0070407 | A1 | 3/2009 | Castle et al. |
| 2009/0164875 | A1 | 6/2009 | Rance et al. |
| 2009/0164876 | A1 | 6/2009 | Logan et al. |
| 2009/0286509 | A1 | 11/2009 | Huber et al. |
| 2010/0058410 | A1 | 3/2010 | Rance et al. |
| 2010/0088126 | A1 | 4/2010 | Iaia et al. |
| 2010/0162260 | A1 * | 6/2010 | Ibrahim .................. G06F 9/505 718/105 |
| 2010/0293048 | A1 | 11/2010 | Singolda et al. |
| 2012/0066259 | A1 | 3/2012 | Huber et al. |
| 2012/0158888 | A1 | 6/2012 | Rance et al. |
| 2012/0191582 | A1 | 7/2012 | Rance et al. |
| 2017/0048300 | A1 | 2/2017 | Rance et al. |

OTHER PUBLICATIONS

Final Office Action, dated Aug. 8, 2011, U.S. Appl. No. 12/004,532, filed Dec. 21, 2007.
Advisory Action, dated Oct. 19, 2011, U.S. Appl. No. 12/004,532, filed Dec. 21, 2007.
Non-Final Office Action, dated Apr. 8, 2014, U.S. Appl. No. 12/004,532, filed Dec. 21, 2007.
Notice of Allowance, dated Dec. 3, 2014, U.S. Appl. No. 12/004,532, filed Dec. 21, 2007.
Non-Final Office Action, dated Aug. 17, 2011, U.S. Appl. No. 12/151,768, filed May 8, 2008.
Final Office Action, dated Feb. 29, 2012, U.S. Appl. No. 12/151,768, filed May 8, 2008.
Advisory Action, dated Jul. 18, 2012, U.S. Appl. No. 12/151,768, filed May 8, 2008.
Non-Final Office Action, dated Aug. 23, 2013, U.S. Appl. No. 12/151,768, filed May 8, 2008.
Final Office Action, dated Jul. 16, 2014, U.S. Appl. No. 12/151,768, filed May 8, 2008.
Final Office Action, dated Aug. 28, 2014, U.S. Appl. No. 12/151,768, filed May 8, 2008.
Non-Final Office Action, dated Apr. 22, 2015, U.S. Appl. No. 12/151,768, filed May 8, 2008.
Final Office Action, dated Mar. 9, 2016, U.S. Appl. No. 12/151,768, filed May 8, 2008.
Advisory Action, dated Jul. 5, 2016, U.S. Appl. No. 12/151,768, filed May 8, 2008.
Notice of Allowance, dated Oct. 5, 2016, U.S. Appl. No. 12/151,768, filed May 8, 2008.
Non-Final Office Action, dated Jun. 7, 2011, U.S. Appl. No. 12/231,493, filed Sep. 2, 2008.
Final Office Action, dated Nov. 16, 2011, U.S. Appl. No. 12/231,493, filed Sep. 2, 2008.
Advisory Action, dated Jan. 26, 2012, U.S. Appl. No. 12/231,493, filed Sep. 2, 2008.
Non-Final Office Action, dated Jul. 6, 2013, U.S. Appl. No. 12/231,493, filed Sep. 2, 2008.
Final Office Action, dated Aug. 1, 2013, U.S. Appl. No. 12/231,493, filed Sep. 2, 2008.
Non-Final Office Action, dated Mar. 25, 2014, U.S. Appl. No. 12/231,493, filed Sep. 2, 2008.
Notice of Allowance, dated Oct. 15, 2014, U.S. Appl. No. 12/231,493, filed Sep. 2, 2008.
Non-Final Office Action, dated Oct. 11, 2012, U.S. Appl. No. 12/969,443, filed Dec. 15, 2010.
Final Office Action, dated Jun. 3, 2013, U.S. Appl. No. 12/969,443, filed Dec. 15, 2010.
Advisory Action, dated Aug. 13, 2013, U.S. Appl. No. 12/969,443, filed Dec. 15, 2010.
Non-Final Office Action, dated Dec. 16, 2013, U.S. Appl. No. 12/969,443, filed Dec. 15, 2010.
Final Office Action, dated Dec. 2, 2015, U.S. Appl. No. 12/969,443, filed Dec. 15, 2010.
Notice of Allowance, dated Apr. 8, 2016, U.S. Appl. No. 12/969,443, filed Dec. 15, 2010.
Final Office Action, dated Oct. 17, 2014, U.S. Appl. No. 12/969,443, filed Dec. 15, 2010.
Non-Final Office Action, dated Oct. 15, 2012, U.S. Appl. No. 13/011,652, filed Jan. 21, 2011.
Final Office Action, dated Aug. 13, 2013, U.S. Appl. No. 13/011,652, filed Jan. 21, 2011.
Notice of Allowance, dated Dec. 12, 2013, U.S. Appl. No. 13/011,652, filed Jan. 21, 2011.
Non-Final Office Action, dated May 21, 2015, U.S. Appl. No. 13/011,652, filed Jan. 21, 2011.
Final Office Action, dated Jan. 14, 2016, U.S. Appl. No. 13/011,652, filed Jan. 21, 2011.
Advisory Action, dated Apr. 20, 2016, U.S. Appl. No. 13/011,652, filed Jan. 21, 2011.
Notice of Allowance, dated Nov. 28, 2016, U.S. Appl. No. 13/011,652, filed Jan. 21, 2011.
Non-Final Office Action, dated Jan. 31, 2017, U.S. Appl. No. 15/237,509, filed Aug. 15, 2016.
Final Office Action, dated Aug. 14, 2017, U.S. Appl. No. 15/237,509, filed Aug. 15, 2016.

* cited by examiner

LEAD GENERATION FOR CONTENT DISTRIBUTION SERVICE

CROSS-REFERENCE TO RELATED APPLICATIONS

This non-provisional patent application is a continuation of U.S. patent application Ser. No. 13/011,652, filed Jan. 21, 2011 and entitled "Lead Generation for Content Distribution Service," now U.S. Pat. No. 9,619,809, issued Apr. 11, 2017. This application is also related to U.S. patent application Ser. No. 12/969,443, filed Dec. 15, 2010 and entitled "System and Method for Distributing Web Events via Distribution Channels," now U.S. Pat. No. 9,420,030, issued Aug. 16, 2016. The disclosures of the aforementioned are incorporated by reference including all references cited therein.

FIELD OF THE INVENTION

The present invention generally relates to data gathering. More particularly, the present invention concerns the collection of subscriber data during a webcasting service and the use of such data to generate a lead in response to a lead request.

BACKGROUND OF THE INVENTION

A variety of communication methods, such as print, radio, and television, are available to effectively disseminate information to a large targeted audience. Another viable communication method is internet broadcasting or webcasting.

A number of webcasting services and vendors exist to enable a user of any experience level to produce and deliver a live or on demand webcast to an audience. A webcasting service, for example, may require a user to subscribe or register for the webcasting service by providing typical registration information (e.g., name, address, phone number, electronic mail address, birthday, occupation, etc.) and additional pertinent information such as geographic location, relevant business industry, or salary information. Thus, in addition to webcasts, presentations, and audio/video files, a webcasting service may collect and store a variety of information about its registered users and content contributors. This information may be valuable to a variety of entities, including a content contributor of the webcasting service or a third party, interested in finding a business lead.

There is a need for an improved system for generating a lead.

SUMMARY OF THE INVENTION

A content distribution service may provide lead information to content providers or other entities associated with a broadcast. A broadcast may include video, audio, or other media content provided to one or more subscribers over a network such as the Internet. A subscriber may register with the broadcasting service and provide data associated with one or more attributes, or remain anonymous as a non-registered user of the service. The content distribution or broadcasting service may generate leads by collecting and determining subscriber attributes for each subscriber. The leads may be generated in response to a request by a content provider or other requestor, or in response to an event such as the creation of a new broadcast. Subscriber attribute information may be collected from a subscriber in a progressive manner such that sequentially small portions of data are collected over a period of time.

In a first claimed embodiment, a method for generating a lead is claimed. Through the method, a first set of subscriber attributes is received at a server in response to providing the subscriber with a first service access. A second set of subscriber attributes at the server in response to providing the subscriber with a second service access is also received. A lead generator engine receives a lead request associated with a desired attribute of a subscriber and identifies one or more leads in response to the lead request, wherein the one or more leads includes at least one subscriber having a subscriber attribute that corresponds to the desired attribute.

In a second claimed embodiment, a system for generating a lead is claimed. The system includes a channel management module and a lead generator module. Execution of the channel management module by the processor receives a first set of subscriber attributes in response to providing the subscriber with a first service access and receives a second set of subscriber attributes in response to providing the subscriber with a second service access. Execution of the lead generator module by the processor receives a lead request associated with a desired attribute of a subscriber and identifies one or more leads in response to the lead request, wherein the one or more leads include at least one subscriber having a subscriber attribute that corresponds to the desired attribute.

In a third claimed embodiment, a computer-readable storage medium is claimed. The storage medium includes a computer program that is executable by a processor to perform a method for generating a lead. The method includes receiving a first set of subscriber attributes in response to providing a subscriber with a first service access, receiving a second set of subscriber attributes in response to providing the subscriber with a second service access, receiving a lead request associated with a desired attribute of a subscriber, and identifying one or more leads in response to the lead request, wherein the one or more leads include at least one subscriber having a subscriber attribute that corresponds to the desired attribute.

DETAILED DESCRIPTION

The present technology may provide a content broadcasting service while providing lead information to content providers or other entities associated with a broadcast. The broadcasts may involve video, audio or other media content provided over a network such as the Internet to one or more subscribers. The network based broadcast service may collect or determine attributes for each subscriber, and use the subscriber attributes to generate leads. The leads may be generated in response to a request by a person, for example a content provider or other requestor, or in response to an event such as the creation of a new broadcast. Subscriber attribute information may be collected from a subscriber in a progressive manner such that sequentially small portions of data are collected over a period of time. A subscriber may register with the broadcasting service of the present technology and provide data associated with one or more attributes, or remain anonymous as a non-registered user of the service. The present technology may collect certain data, such as behavioral data, for anonymous and unregistered users which can be incorporated into the user attributes when the user registers with the service.

Figure 1:
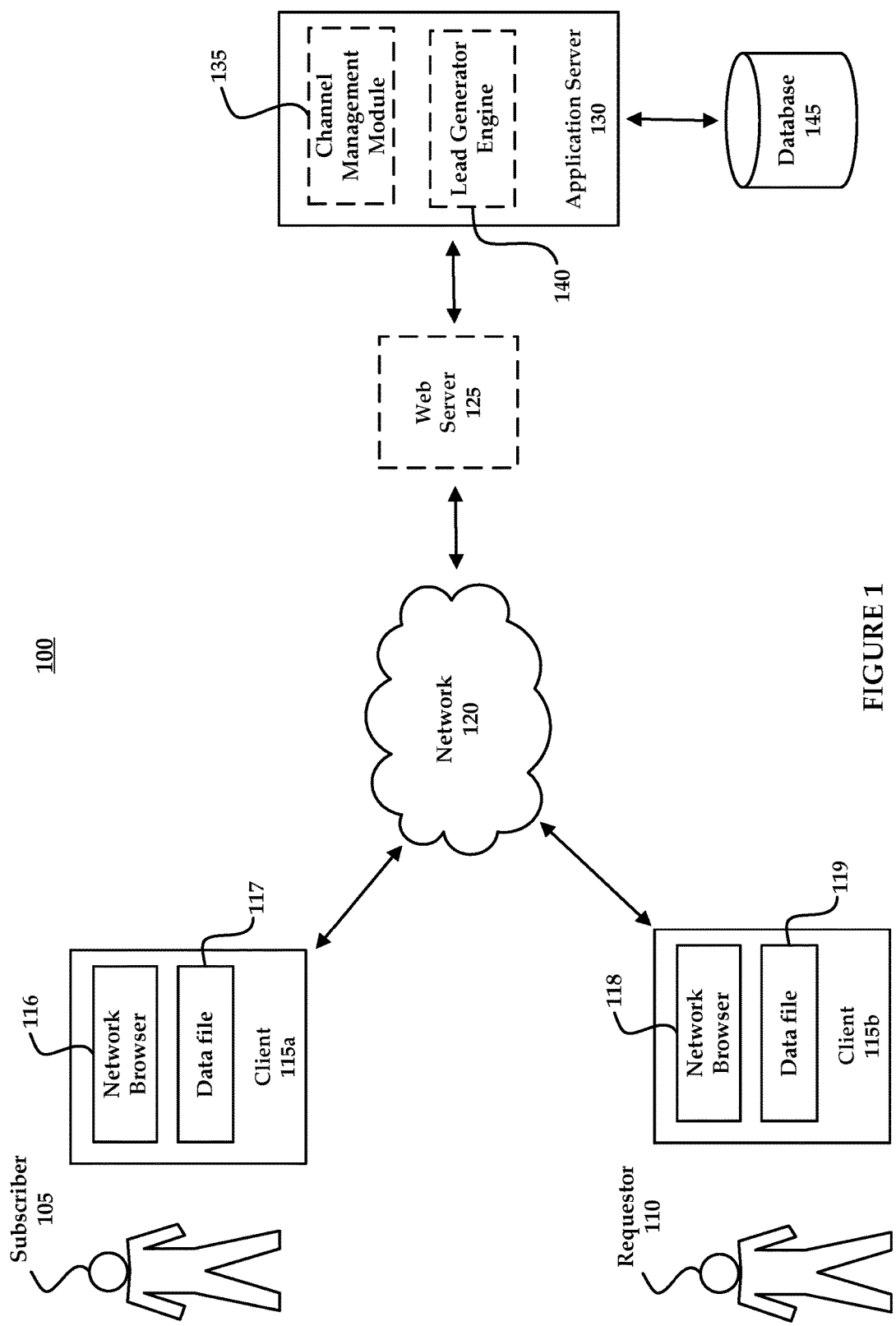
FIG. 1 illustrates an overview diagram of a lead generating system used to generate a lead in connection with a webcasting service.

FIG. 1 illustrates an overview diagram of a lead generating system used to generate a lead in connection with a webcasting service. The lead generating system 100 of FIG. 1 includes subscriber 105, requestor 110, clients (115a, 115b), network 120, web server 125, application server 130, channel management module 135, lead generator engine 140, and database 145.

Client 115a includes network browser 116 and data file 117. Network browser 116 may access a service and provide a content page, such as a web page, provided by application server 130 and web server 125 over network 120. Data file 117 may include content that is created and maintained by network browser 116, such as a web page cookie file.

Client 115b includes network browser 118 and data file 119. Network browser 118 may access the network service and content pages provided by application server 130 and web server 125, and data file 119 may include content created and maintained by network browser 118, similar to data file 117 with respect to network browser 116.

Clients 115a and 115b may be implemented by any of a variety of computing devices, including a workstation, laptop computer, net book computer, computing pad, mobile device, cellular telephone, or other computing device. Clients 115a and 115b are discussed in more detail below with respect to FIG. 6.

Lead generating system 100 may comprise a plurality of subscribers 105, requestors 110, and clients (115a, 115b) in connection with a webcasting service. Using client 115a, for example, subscriber 105 may subscribe (i.e. create an account) or register with a webcasting service provided by application server 130 (i.e., channel management module 135). Once subscriber 105 has registered for the webcasting service, subscriber 105 may perform a login (i.e., access subscriber account) and may view a live or on demand webcast provided by another registered subscriber of the webcasting service. Subscriber 105 may also be a content contributor and access the webcasting service to produce and/or deliver a webcast to one or more other registered subscribers.

In one embodiment, subscriber 105 is an anonymous user of a content broadcasting system in which the present technology is utilized. An anonymous user may be one who has not subscribed, registered, or created an account with the webcasting service. The anonymous user may use the webcasting service to view a webcast provided by a registered subscriber without first providing identifying data that may be used as a subscriber attribute. The anonymous user may, however, be identified and/or tracked by a data file (e.g., web cookie, browser cookie, or HTTP cookie) stored at a network server or stored locally at the anonymous user's machine (e.g., client device) by a network browser. When the anonymous user subsequently registers with the service (i.e., becomes a registered user), the present system may store the data in the stored data file along with other subscriber attributes.

When registering for the webcast service, subscriber 105 may be required to input or provide via client 115a registration information and/or subscriber data, including but not limited to name, address, electronic mail (e-mail) address, country, phone number, birthday, age, gender, company name, company size, industry, and occupation. Subscriber 105 may also be required to input or provide other pertinent information or subscriber data such as time zone, geographic location, or salary information. Subscriber data may be stored in database 145. Subscriber data may be associated with subscriber 105 having an account with the webcast service.

Lead generating system 100 may include database 145 for storing and managing data. Database 145 may store webcasts, presentations, audio/video files, and other data for use with the webcast service provided by application server 130. Database 145 may be separate from or integrated with application server 130. Database 145 may also store data associated with each subscriber 105 or requestor 110 (e.g. registration information, contact information). Database 145 may also store any updates to subscriber data received from/provided by subscriber 105.

Requestor 110 may be a registered subscriber (i.e., content contributor) of the webcasting service provided by application server 130. For example, requestor 110 may be a content provider of webcasts relating to green technology, architecture, and engineering and may be looking for attendees for an upcoming webcast. Requestor 110 may also be a third party (i.e., not a content contributor) interested in identifying business leads and receiving relevant information about subscriber 105. For example, requestor 110 may be a provider of consulting services related to data protection, privacy, and security and may be looking for a new, potential client i.e., subscriber 105) interested in acquiring those services.

Figure 6:
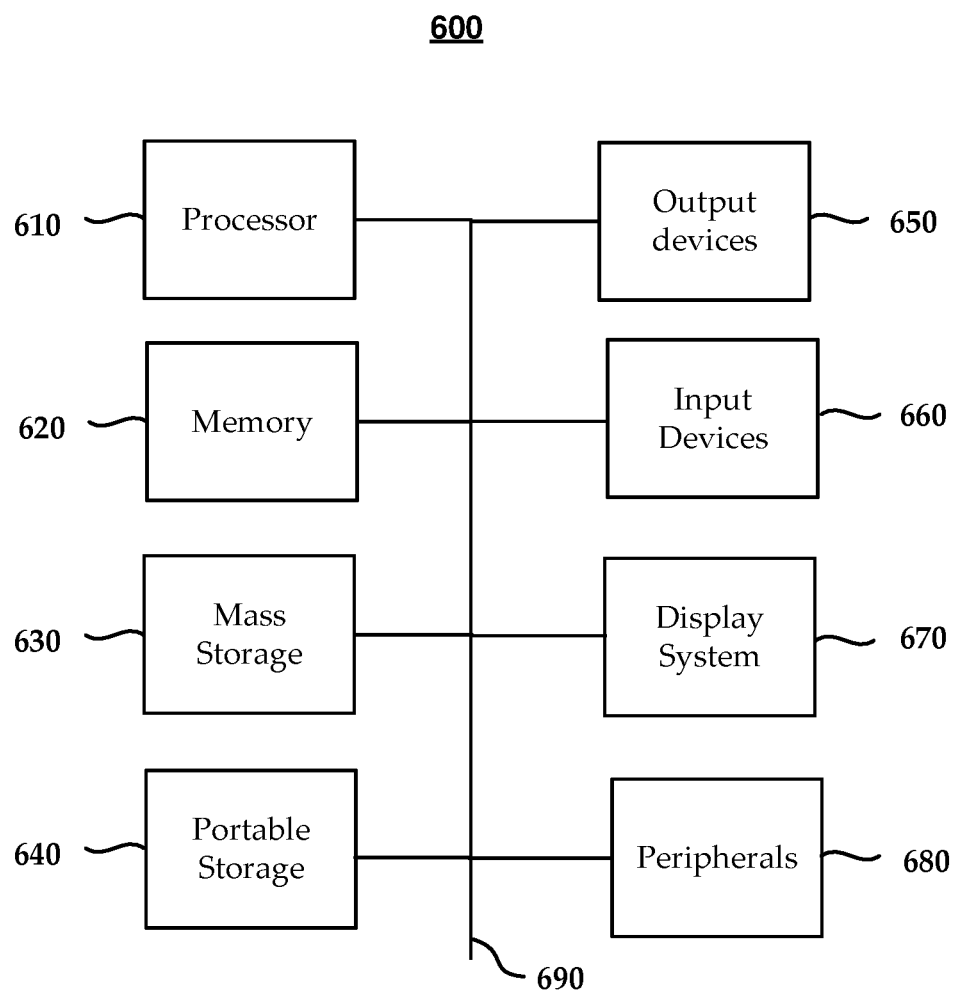
FIG. 6 illustrates a computing system that may be used to implement an embodiment of the present invention.

Clients (115a, 115b) are inclusive of a general purpose computing device capable of accessing information over a network like the system illustrated in FIG. 6. Clients (115a, 115b) may be implemented as computing devices such as workstations, servers, lap top computers, mobile devices, or other computing devices that can communicate over network 120. Clients (115a, 115b) include software and/or hardware capable of sending, receiving, and processing data such as subscriber data, webcasts, presentations, and audio/video files. Clients (115a, 115b) may receive data or a request from subscriber 105 or requestor 110, and send the data or request over network 120 to application server 130 for processing.

Network 120 is inclusive of any communication network such as the Internet, Wide Area Network (WAN), Local Area Network (LAN), intranet, extranet, private network, or other network. Application server 130 may be accessed via optional web server 125. Web server 125 may receive and process data and/or requests from clients (115a, 115b). For example, subscriber 105 may request and provide data to become a registered subscriber with the webcasting service provided by application server 130. Processing the data and/or request may include sending data to channel management module 135 or a request to lead generator engine 140 on application server 130, receiving a response from channel management module 135 or lead generator engine 140, and sending a response or data to web server 125. Web server 125 may then forward the response or data to the requesting client (115a, 115b).

Application server 130 may be implemented in a general computing device that otherwise communicates with database 145 and web server 125. An example of such a device is the general computing system illustrated in FIG. 6. As illustrated in FIG. 1, application server 130 includes channel management module 135 and lead generator engine 140.

Channel management module 135 may by executable by a processor to provide web content (i.e., webcast) to a subscriber via a distribution channel. An example of a channel management module is described in U.S. patent application Ser. No. 12/969,443 filed Dec. 15, 2010 and entitled "System and Method for Distributing Web Events via Distribution Channels," which is hereby incorporated by reference.

Channel management module 135 may also be executable to process data or a request from subscriber 105 or requestor 110 to subscribe or register with the webcasting service provided by application server 130. For example, channel management module 135 may create a subscriber account and register subscriber 105 with the webcasting service by processing subscriber data such as contact information and/or other pertinent information provided by subscriber 105. Subscriber 105 may also provide a webcast and/or other content (e.g., images, audio, video, documents, slide shows, and other digital content). Channel management module 135 may be executable to receive content from subscriber 105 and present and distribute the content to other registered webcasting service subscribers. Channel management module 135 may also be executable to allow subscriber 105 to access current or past content provided by other webcast service subscribers.

Application server 130 may also include lead generator engine 140. Lead generator engine 140 and its various components may be stored in memory and executable by a processor of a network computing device to detect a lead request, identify a lead, and provide the identified lead to a requestor. The lead generation process is discussed in more detail in FIGS. 2, 4, and 5 below. Lead generator engine 140 and the corresponding network computing device may be a stand-alone software and/or hardware component as illustrated in FIG. 1. Lead generator engine 140 and the corresponding network computing device may be an integrated enterprise system or integrated directly with client 115A, 115B.

Figure 2:
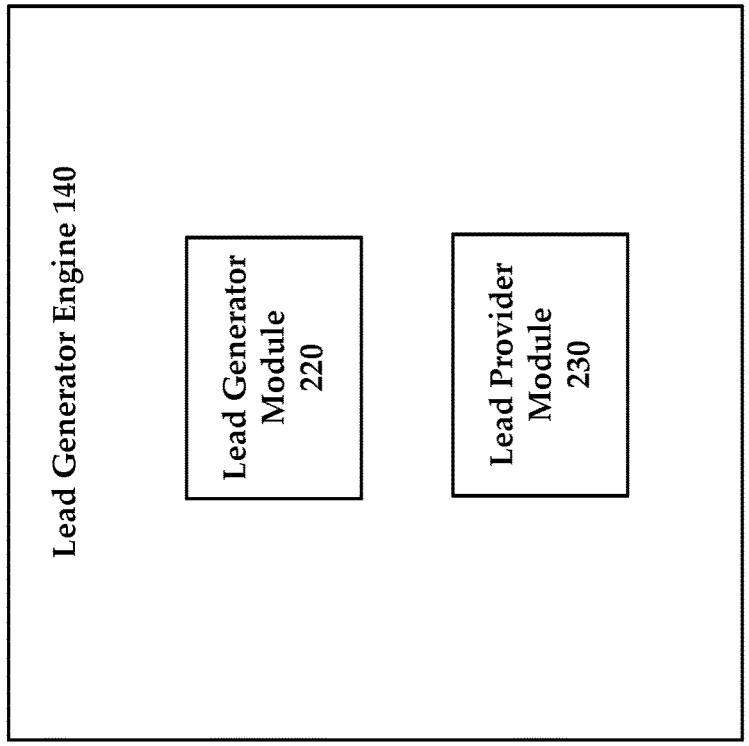
FIG. 2 illustrates a block diagram of an exemplary lead generator engine.

FIG. 2 illustrates a block diagram of the lead generator engine 140 of FIG. 1. Lead generator engine 140 may be executable by one or more processors of a network computing device, such as application server 130, to receive a request and/or data from subscriber 105 or requestor 110, detect a lead request, identify a lead in response to a lead request, provide an identified lead to requestor 110, and store data in database 145. Lead generator engine 140, which is stored in memory of application server 130 of FIG. 1 or an appropriate network computing device, may include various modules such as lead generator module 220 and lead provider module 230. Any one component of lead generator engine 140 or any combination thereof may process any request or data received from subscriber 105 or requestor 110. Although lead generator engine 140 is shown as having three modules, the modules in FIG. 2 are exemplary and alternative embodiments may comprise additional or fewer elements and still be within the scope of embodiments of the present invention.

Lead generator module 220 is executable by a processor to automatically (i.e., without input by a system administrator, subscriber 105, or requestor 110) receive a lead request associated with a desired attribute of a subscriber, and identify and generate a lead following the receipt of a lead request. A lead request may be initiated by a requestor 110 or automatically initiated in response to an event. When generated by a requestor 110, lead generator module 220 may receive a desired subscriber attribute from requestor 110. An automatically generated lead request may be generated, for example, in response to detecting a new broadcast scheduling. Lead generator module 220 may be executable to compare the desired attributes indicated by requestor 110 to subscriber data stored in database 145. Database 145 may be accessed by lead generator module 220 or another module to locate and identify a registered subscriber 105 (or anonymous user) having one or more of the desired attributes identified by requestor 110.

Lead provider module 230 is executable by a processor to provide one or more leads identified by lead generator module 220 to requestor 110. Lead provider module 230 may allow requestor 110 to manage the leads via a user interface, for example, by sorting the identified leads by any desired manner (i.e., sort by relevance, by geographic location, etc.). Lead provider module 230 is described in more detail in FIG. 5 below.

Figure 3:
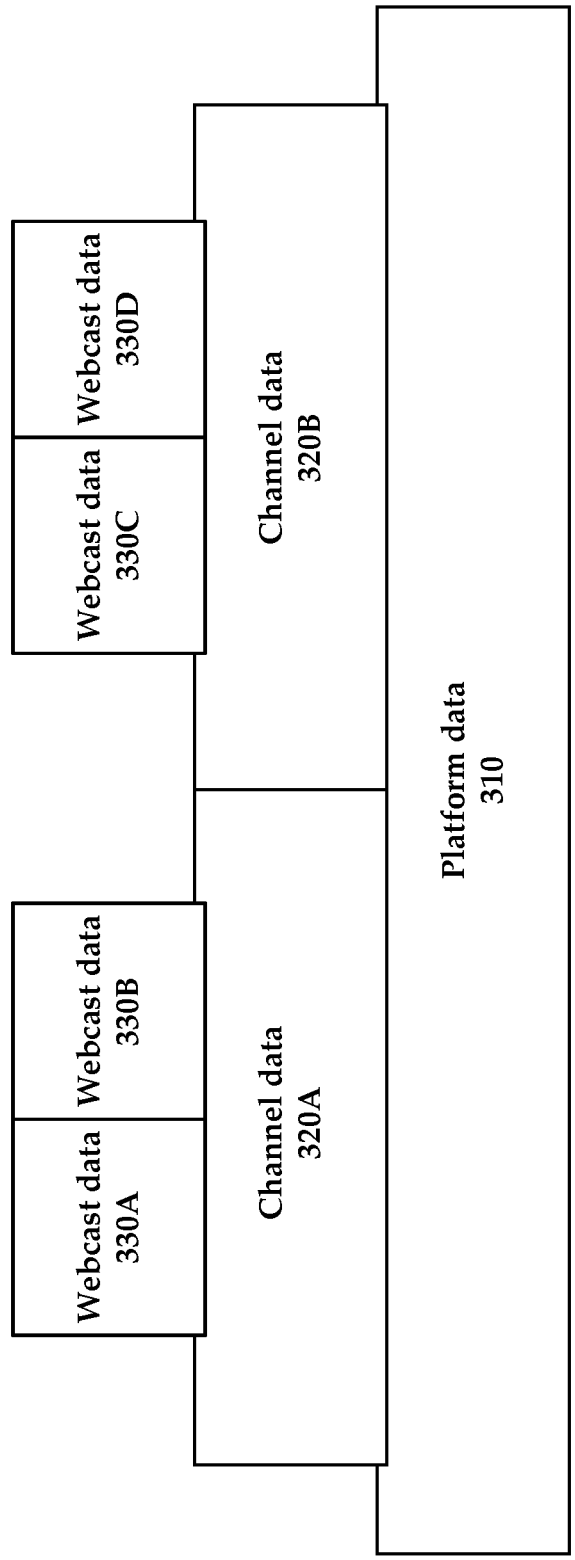
FIG. 3 is a block diagram of the different types of data associated with an exemplary lead generating system.

FIG. 3 is a block diagram of different types of data which may be associated with the lead generating system of FIG. 1. FIG. 3 illustrates various levels of data that may be collected at various times in the context of lead generating system 100 via clients (115a, 115b) and transmitted to application server 130 for processing. Various types of data may also be collected at various times from or based on the preferences, habits, behavioral patterns, and/or viewing history of subscriber 105 and be used for developing and generating a lead.

Platform data 310 may include subscriber attributes and other subscriber-related data collected from subscriber 105, requestor 110, or another source. The data may be collected at the time of subscriber registration, before registration, or after registration.

A subscriber attribute may be collected before a user is registered with the service provided by the present technology. As such, the present technology allows a subscriber to experience content while being "anonymous" (i.e., not registered) to the service. For example, subscriber 105 may access a broadcast of content without affirmatively providing any information to the service provided by the present technology. Rather, subscriber 105 may simply access a content page (i.e., web page) providing the service and receive the content network browser 116. In this manner, the subscriber may participate in at least a portion of the services provided by web server 125 and application server 130 while remaining "anonymous", i.e. not registered with the service.

Information for an anonymous subscriber (e.g., subscriber attributes) may be collected based on the subscriber's activities with the web service. Upon receiving content provided by web server 125 via network 120, network browser 116 may create a data file, (e.g. a web cookie) based on the subscriber's activity with the service. The data file 117 may store the user's activity and indicate content viewed by the user and other data. The data file 117 may be transmitted to web server 125 by network browser 116, for example during a request by the user to the service. The data file may then be updated by network browser 116 upon receiving a response corresponding to a request to the service.

Subscriber attributes may be collected based on actions of a registered user of the service. A user may register with the service by providing basic information required to create an account with the service. For example, subscriber 105 may be required to provide registration information and/or subscriber data such as subscriber name, address, e-mail address, country, phone number, birthday, age, gender, company name, company size, industry, and occupation. Subscriber 105 may also be required to input or provide other pertinent information or subscriber data such as time zone, geographic location, or salary information. Platform data 310 may also include preferences of subscriber 105. Subscriber 105 may, for example, indicate preferences regarding particular webcasts topics or subject matter, or viewing times or durations. Additional subscriber attributes may be collected based on user behavior and behavior patterns, such as time of access of the service, content viewed, and other behavior of the subscriber within the service provided.

Subscriber attributes may be collected from a user in a progressive manner. In some embodiments, upon requesting to view a first broadcast, a user may be prompted to provide a minimal amount of information. The information may be used to create subscriber attributes. Upon receiving the minimal first set of subscriber information (i.e., attributes), the content is provided to the user as a first service access (e.g., the first requested broadcast). When the user requests access to a second broadcast, another set of attributes may be collected from the user. Upon receiving the second set of attributes, the user may be provided with the second service access (i.e., the second requested broadcast). In this manner, subscriber attributes may be progressively collected from a user over time, for example collected in incremental sets of attributes for each access of the service. Collecting attribute data progressively may encourage a user to explore and participate in broadcasts and other content offerings.

In one embodiment, subscriber 105 may be prompted to provide information/answers to questions using a standard form. The standard form may include one or more drop-down menu of pre-set answer choices. The standard form may also allow subscriber 105 to answer a question or provide information by inputting the answer or information in a text box (i.e., custom field).

Channel data (320A, 320B) may also be collected from subscriber 105. The webcasting service may have multiple channels. Through a 'distribution channel' or 'channel,' a subscriber (i.e., channel owner) may create or publish original content (i.e., content chosen or created by subscriber 105) and/or publish content from another source or channel for viewing by another subscriber. Although channel data (320A, 320B) is shown in FIG. 3 to correspond to two blocks (i.e., two channels), the webcasting service may include a plurality of channels and collect channel data for each channel. A channel may include a one or more webcasts or other web content based on or related to a particular subject matter, category, audience, community or another group. For example, one channel may distribute webcasts and content related to environment law and regulation while another channel may be directed towards media and marketing.

In order to subscribe to the channel (e.g., review content or participate in a webcast from the channel), a channel owner may require subscriber 105 to provide additional information (i.e., channel data (320A, 320B)). Additional information may include any information the channel owner may want to know about subscriber 105. For example, channel data (320A, 320B) may include the specialty or expertise of subscriber 105, what other related channels subscriber 105 subscribes to, whether subscriber 105 is interested in acquiring a particular service or product, a price range that subscriber 105 is willing to pay to acquire a particular product or service, how many webcasts or web events subscriber 105 participates in/views per month, and other data.

Webcast data (330A, 330B, 330C, 330D) may also be collected from subscriber 105. A webcast or other content may be distributed through one or more channels. A channel owner may require subscriber 105 interested in participating in a webcast provided by the channel to provide additional data (i.e., webcast data (330A, 330B, 330C, 330D)). Additional data may include any information the channel owner may want to know about subscriber 105. Although webcast data (330A, 330B, 330C, 330D) is shown in FIG. 3 to correspond to four blocks (i.e., four webcasts), the webcasting service may include a plurality of channels (providing a plurality of webcasts) and collect webcast data for each webcast distributed by a channel. For example, webcast data (330A, 330B, 330C, 330D) may include the reason why subscriber 105 is interested in the webcast (i.e., goal(s) of attending the webcast), whether subscriber 105 is interested in other webcasts similar to the webcast being presented, whether the subscriber 105 has/is attending another webcast similar to the webcast being presented, and other data.

Application server 130 may receive platform data 310, channel data (320A, 320B), and webcast data (330A, 330B, 330C, 330D) from subscriber 105 and may store the data in database 145 as subscriber attributes. Platform data 310, channel data (320A, 320B), and webcast data (330A, 330B, 330C, 330D) may be associated with subscriber 105 through the account subscriber 105 created with the webcasting service. Application server 130 (i.e., channel management module 135) may also prompt subscriber 105 or requestor 110 to provide any updates to any previously provided data (e.g. webcast, channel, webcast data) and store such data at database 145. In one embodiment, application server 130 (i.e., channel management module 135) may automatically pre-populate or fill-in any data previously provided by subscriber 105 at one data level if such data is required at another level. For example, if during registration for the webcasting service, subscriber 105 provides a job title, industry, and company name, subscriber 105 will not have to re-enter such data if/when subscriber 105 chooses to subscribe to a specific channel or attend a particular webcast. Application server 130 may automatically provide or pre-populate the fields if/when subscriber 105 is prompted for such information.

Figure 4:
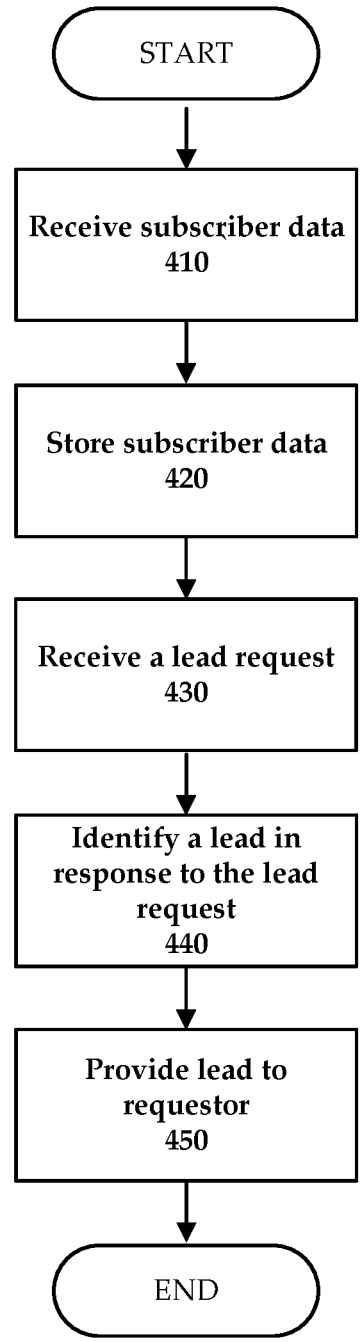
FIG. 4 is a flow chart illustrating an exemplary method for generating a lead in response to a lead request.

FIG. 4 is a flow chart illustrating a method for generating a lead in response to a lead request. The steps identified in FIG. 4 (and the order thereof) are exemplary and may include various alternatives, equivalents, or derivations thereof including but not limited to the order of execution of the same.

At step 410, application server 130 may receive subscriber data from subscriber 105. Subscriber data may include platform data 310, channel data (320A, 320B), webcast data (330A, 330B, 330C, 330D), and any other data associated with subscriber 105. Subscriber data may also include data regarding the preferences, habits, behavioral patterns, and/or viewing history of subscriber 105. The application server 130 stores the received subscriber data as one or more subscriber attributes in database 145 at step 420.

In one embodiment, application server 130 requests subscriber 105 to verify the accuracy of the subscriber data. For example, application server 130 may request that subscriber 105 verify the accuracy of subscriber data collected during registration with the webcasting service or registration with a distribution channel or webcast. In another embodiment, application server 130 may query subscriber 105 for additional subscriber data not previously provided to application server 130. For example, subscriber data may be collected progressively as the subscriber accesses a service such as a broadcast. Any additional subscriber data (i.e., updates to existing data or new data) received from subscriber 105 as a result of the query may be stored at database 145.

At step 430, lead generator module 220 receives a lead request. A lead may include any individual, group, or community that possesses one or more attributes. A lead request may be a specific request initiated by requestor 110 and may identify one or more desired attributes of a subscriber. A lead request may also be initiated automatically, for example in response to, a newly scheduled or calendared webcast for presentation, the detection of an upcoming scheduled webcast (i.e., webcast to be presented within a predetermined time period such as the next week or three days), a completed webcast, and registration for a particular webcast or event. The resulting automatically generated leads may be provided to an owner of the corresponding webcast. A lead request may also specify subscriber participation or attributes in connection with a platform, channel, or webcast, such as submission of subscriber 105 feedback or comments regarding a webcast or other content, a subscriber 105 question or query, a subscriber 105 response to a poll or survey (e.g., vote), subscriber 105 interaction with a social network or other relevant website, the retrieval of embedded source code, data/information sharing with other subscribers (e.g., contact information), or any other event.

At step 440, lead generator module 220 may identify a lead in response to the lead request received at step 430. At step 450, lead generator engine 140 (via lead provider module 230) provides the identified lead to requestor 110. The steps of identifying and generating a lead in response to a lead request (step 440) and providing an identified lead to a requestor 110 (step 450) are described in more detail in FIG. 5 below.

Figure 5:
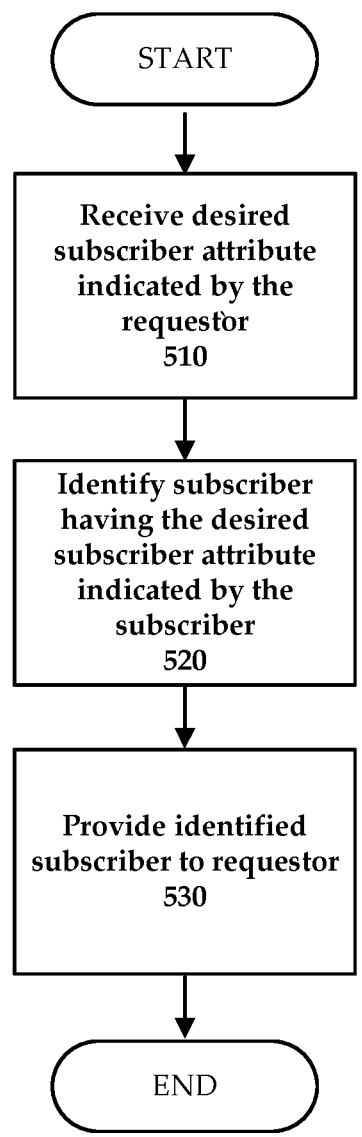
FIG. 5 is a flow chart illustrating an exemplary method for identifying a lead in response to a lead request.

FIG. 5 is a flow chart illustrating a method for identifying a lead in response to a lead request. The steps identified in FIG. 5 (and the order thereof) are exemplary and may include various alternatives, equivalents, or derivations thereof including but not limited to the order of execution of the same.

At step 510, lead generator module 220 receives from requestor 110 information regarding a desired subscriber attribute. A subscriber attribute may be generated from or associated with subscriber data previously provided to application server 130 (e.g., during registration for the webcasting service or registration for a channel or webcast). For example, a subscriber attribute may be the industry, salary range, or geographic location information associated with subscriber 105. A subscriber attribute may also include information about the viewing history, behavioral patterns, or preferences of subscriber 105 in connection with the webcasting service. Viewing history or behavioral patterns, for example, may include the number or type(s) of webcasts subscriber 105 has viewed within a specific time period.

In order to receive a relevant lead, requestor 110 may identify or specify one or more desired subscriber attributes of interest (including desired ranges). For example, if a requestor 110 is a consultant in media and marketing in the pharmaceutical industry and looking for a lead (i.e. potential new customer) interested in consulting services, requestor 110 may request a lead. Requestor 110 may then indicate desired subscriber attributes such as "Marketing Director" (job title), "California" (geographical location), and "Pharmaceuticals" (industry). As another example, if requestor 110 is presenting a webcast on youth trends in social media and is looking for leads for attendees to the webcast, requestor 110 may request a lead and indicate desired subscriber attributes such as "Student" (job title) and "age 18-24" (range). In one embodiment, requestor 110 may request a lead to a subscriber 105 based on the actions, behavioral patterns or viewing history of the subscriber. For example, requestor 110 may specify an attribute as a subscriber who has viewed a webcast regarding environmental law (particular topic/type) in the last six months (time period).

At step 520, lead generator module 220 may access database 145 to retrieve identification information of one or more subscribers based on the desired attributes indicated by requestor 110 at step 510. Lead generator module 220 may send a query with the desired attributes indicated by requestor 110 to database 145. Database 145 receives the query, identifies subscribers with attributes that match the desired attributes, and transmits the matching subscriber information back to lead generator module 220.

At step 530, lead provider module 230 may provide the one or more subscribers identified at step 520 to requestor 110. The lead (i.e., identified subscriber) may be provided to requestor 110 via electronic mail (e-mail), SMS text message, instant messenger, chat, user interface provided within a content page via a network browser, or any other available communication medium. In one embodiment, leads may be presented to requestor 110 by statistics and/or in the order of relevance. The leads may be presented in order from the lead having the highest probability of a match to the lowest probability. For example, if requestor 110 identified five subscriber attributes, the identified leads having all five attributes are presented first as those having a 100% match, while those leads having only three or one of the five attributes are presented later with a lower percentage match. In one embodiment, lead provider module 230 may provide leads to requestor 110 automatically at predetermined time intervals (e.g., monthly, weekly, daily).

In yet another embodiment, lead provider module 230 may invite (or suggest to) requestor 110 to view another or updated set of leads. For example, where requestor 110 has previously requested and received a set of leads from lead provider module 230, lead provider module 230 may, at a later time, present a set of additional leads to requestor 110 that were previously not available.

In one embodiment, lead provider module 230 may bill requestor 110 for any provided leads. Lead provider module 230 may, for example, bill requestor 110 for each lead provided. In another embodiment, lead provider module 230 may bill requestor 110 for the number of desired attributes. For example, a request for leads where only three subscriber attributes are identified may be billed at a lower rate than a more specific request for leads having six or seven subscriber attributes. In yet another example, requestor 110 may be billed for leads distributed on a particular time interval. For example, a set of leads may be released to the requestor 110 on a weekly or monthly basis and requestor 110 may be billed accordingly.

FIG. 6 illustrates a computing system 600 that may be used to implement the present technology. System 600 of FIG. 6 may be used to implement clients 115a and 115b, web server 125, application server 130, and database 145 in the context of the system of FIG. 1. The computing system 600 of FIG. 6 includes one or more processors 610 and main memory 620. Main memory 620 stores, in part, instructions and data for execution by processors 610. Main memory 620 can store the executable code when in operation. Main memory 620 may also include a database such as database 145 illustrated in FIG. 1. The system 600 of FIG. 6 further includes a mass storage device 630, portable storage device 640, output devices 650, user input devices 660, a display system 670, and peripheral device(s) 680.

The components shown in FIG. 6 are depicted as being connected via a single bus 690. The components, however, may be connected through one or more data transport means. For example, processors unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processors 610. Mass storage device 630 may store the system software for implementing embodiments of the present invention for purposes of loading software into main memory 620.

Portable storage device 640 operates in conjunction with a portable non-volatile storage medium, such as a floppy disk, compact disk or Digital video disc, to input and output data and code to and from the computing system 600 of FIG. 6. The system software for implementing embodiments of the present invention may be stored on such a portable medium and input to the computing system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 may receive textual and graphical information, and process the information for output to the display device.

Peripheral device(s) 680 may include any type of computer support device to add additional functionality to the computer system. For example, peripheral device(s) 680 may include a modem or a router.

The components contained in the computing system 600 of FIG. 6 are those typically found in computer systems that may be suitable for use with embodiments of the present invention and are intended to represent a broad category of such computer components that are well known in the art. Thus, the computing system 600 of FIG. 6 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, and other suitable operating systems. The steps of the method of FIGS. 4, 5, and 6 (and its various alternatives) may be performed by a module or engine stored on a computer-readable storage medium (e.g., optical disc, memory card, etc.) comprising instructions executable by a processor of a computing device.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to enable others skilled in the art to best utilize the technology in various embodiments and with various modifications as are suited to the particular use contemplated. It is intended that the scope of the technology be defined by the claims appended hereto.

What is claimed is:

1. A computer-implemented method for generating a lead, the method comprising:
   establishing a webcasting service having a web event;
   streaming the web event to an anonymous user;
   tracking the anonymous user by a data file stored at the webcasting service;
   receiving on a server a first set of user attributes at the server in response to providing the user with a first service access, the first set of user attributes including information about a behavioral pattern of the user in connection with the webcasting service;
   receiving on the server a second set of user attributes at the server in response to providing the user with a second service access;
   automatically detecting a subsequent web event at the webcasting service;
   in response to the automatically detected subsequent web event, automatically receiving on the server a lead request associated with a desired attribute of users, the lead request being automatically initiated in response to the automatically detected subsequent web event; and
   automatically executing a lead generator module stored in memory to identify one or more leads in response to the lead request, the one or more leads including at least one user having a user attribute that corresponds to the desired attribute.

2. The method of claim 1, further comprising billing a requestor of the lead request for the one or more leads provided.

3. The method of claim 1, wherein the user is associated with an account with the webcasting service.

4. The method of claim 1, wherein the user is registered with the webcasting service, and wherein the web event comprises participation of the registered user in connection with a platform, channel, or webcast.

5. The method of claim 1, wherein the web event comprises an addition of a newly registered user.

6. The method of claim 1, wherein the web event comprises participation by an unregistered user in connection with a platform, channel, or webcast.

7. The method of claim 1, wherein the web event comprises registration for a webcast by a user.

8. The method of claim 1, wherein the first set of user attributes includes a data file maintained by a network server.

9. The method of claim 1, wherein the first set of user attributes includes user data received from the user during a registration event, the registration event being associated with user participation in a platform, channel, or webcast.

10. The method of claim 9, further comprising requesting the user to verify accuracy of the user data previously provided by the user to the server.

11. The method of claim 9, further comprising querying the user for additional user data not previously provided to the server.

12. A system for generating a lead, the system comprising:
   a webcasting service having an origination channel;
   a web event in the origination channel, the web event comprising online content synchronized with live audio, the web event streamed from the origination channel to a subscriber;

a channel management module stored on a server and executable by a processor to receive a first set of subscriber attributes in response to providing the subscriber with a first service access, the first set of subscriber attributes including information about a behavioral pattern of the subscriber in connection with the webcasting service, and a second set of subscriber attributes in response to providing the subscriber with a second service access; and a lead generator module stored on the server and executable by the processor to:

automatically detect a subsequent web event in the origination channel;

in response to the automatically detected subsequent web event, automatically receive a lead request at the server, the lead request associated with a desired attribute of the subscriber at the server, the lead request being automatically initiated in response to the automatically detected subsequent web event; and identify one or more leads in response to the lead request, the one or more leads having a subscriber attribute that corresponds to the desired attribute.

13. The system of claim 12, further comprising a lead provider module stored in memory and executable by the processor to provide the lead to a requestor.

14. The system of claim 13, wherein the lead generator module further executes instructions stored in memory to bill the requestor for the provided lead.

15. A non-transitory computer-readable storage medium having embodied thereon a program, the program being executable by a processor to perform a method for generating a lead, the method comprising:

establishing a webcasting service having an origination channel;

establishing a web event in the origination channel, the web event comprising online content synchronized with live audio;

streaming the web event from the origination channel to a subscriber;

receiving a first set of subscriber attributes at a server in response to providing the subscriber with a first service access, the first set of subscriber attributes including information about a behavioral pattern of the subscriber in connection with the webcasting service;

receiving a second set of subscriber attributes at the server in response to providing the subscriber with a second service access;

automatically detecting a subsequent web event in the origination channel;

in response to the automatically detected subsequent web event, automatically receiving a lead request associated with a desired attribute of the subscriber, the lead request being automatically initiated in response to the automatically detected subsequent web event; and identifying one or more leads in response to the lead request, the one or more leads including at least one subscriber having a subscriber attribute that corresponds to the desired attribute.

16. The non-transitory computer-readable storage medium of claim 15, wherein the web event comprises participation by an unregistered subscriber in connection with a platform, channel, or webcast.

17. The non-transitory computer-readable storage medium of claim 15, wherein the subscriber is associated with an account with the webcasting service.

\* \* \* \* \*